US008387991B2

(12) United States Patent
Durling

(10) Patent No.: US 8,387,991 B2
(45) Date of Patent: Mar. 5, 2013

(54) SEALING ASSEMBLY

(75) Inventor: Christopher J. Durling, Bristol (GB)

(73) Assignee: Rolls-Royce PLC, London (GB)

( * ) Notice: Subject to any disclaimer, the term of this patent is extended or adjusted under 35 U.S.C. 154(b) by 171 days.

(21) Appl. No.: 12/711,845

(22) Filed: Feb. 24, 2010

(65) Prior Publication Data

US 2010/0253003 A1    Oct. 7, 2010

(30) Foreign Application Priority Data

Apr. 6, 2009 (GB) .................................. 0905815.7

(51) Int. Cl.
*F16J 15/44* (2006.01)
(52) U.S. Cl. .......................... 277/413; 277/412; 277/421
(58) Field of Classification Search .................. 277/411, 277/412, 413, 421
See application file for complete search history.

(56) References Cited

U.S. PATENT DOCUMENTS

| 4,291,563 | A | 9/1981 | Lewakowski et al. | |
|---|---|---|---|---|
| 5,284,347 | A | 2/1994 | Pope | |
| 6,540,231 | B1 * | 4/2003 | Trantow et al. | 277/355 |
| 6,840,519 | B2 * | 1/2005 | Dinc et al. | 277/413 |
| 2002/0117807 | A1 * | 8/2002 | Yoshida et al. | 277/412 |
| 2005/0285347 | A1 | 12/2005 | Norman et al. | |
| 2007/0296160 | A1 | 12/2007 | Diantonio | |

FOREIGN PATENT DOCUMENTS

| DE | 26 03 867 A1 | 6/1977 |
|---|---|---|
| EP | 0 320 620 A1 | 6/1989 |
| EP | 0 745 793 A1 | 12/1996 |
| EP | 1 130 294 A2 | 9/2001 |
| EP | 1 380 778 A1 | 1/2004 |
| GB | 629770 | 11/1947 |
| GB | 743392 A | 1/1956 |
| GB | 2 418 966 A | 4/2006 |
| JP | A-11-343809 | 12/1999 |
| JP | A-2008-291856 | 12/2008 |

OTHER PUBLICATIONS

Great Britain Search Report issued in British Application No. 0905815.7 on Aug. 3, 2009.
Jun. 4, 2010 Search Report issued in United Kingdom Patent Application No. GB1003043.5.

* cited by examiner

*Primary Examiner* — Gilbert Lee
(74) *Attorney, Agent, or Firm* — Oliff & Berridge, PLC

(57) ABSTRACT

A sealing assembly provides a seal between a first element and a second element, the first element being movable with respect to the second element, wherein the sealing assembly comprises: a sealing member adjacent to the first and second elements; a first seal portion for providing a first seal between the sealing member and the first element, the first seal portion being arranged in a first direction; and a second seal portion for providing a second seal between the sealing member and the second element, the second seal portion being arranged in a second direction, wherein the first direction is arranged at an angle with respect to the second direction and the sealing member is disposed such that the sealing member is movable relative to the second element in the second direction.

12 Claims, 6 Drawing Sheets

SEALING ASSEMBLY

This invention relates to a sealing assembly for providing a seal between a first element and a second element and particularly but not exclusively relates to a movable sealing assembly for a turbomachine.

BACKGROUND

Seals within turbofan engines are conventionally disposed axially and such seals are normally one of two types: labyrinth seals or brush seals. With either type of seal, the seal is attempting to minimise the axial air flow between a rotating element (typically a shaft, disc or bladed disc and a static element (typically a casing). In the case of a labyrinth seal, the rotating element has a series of grooves and the static element has a smooth concentric surface (normally coated with an abradable substance). In the case of a brush seal, the rotating element is a smooth surface and the static element holds a continuous ring of bristles in contact with the smooth rotating surface.

Larger diameter seals often have higher leakage rates than necessary because at large diameters, labyrinth seals must frequently be set to run at large clearances, which is very detrimental to their performance. The reason for this is that there is too much relative movement between the static element and the surface of the rotating part, either from relative lateral (radial) movements or thermal differential expansion or both. It should be noted that lateral (radial) movements of the static element can be due to local deflections as well as movement of the entire static element. Furthermore, the thermal differential expansion issue is often exacerbated by having to use materials for the static and rotating elements which do not have the ideal thermal differential expansion characteristics and also because the relative masses of the elements lead to thermal differential lags. Too much relative movement is often the reason brush seals, which are often more efficient than labyrinth seals, are not suitable at many locations within a turbofan, meaning labyrinth seals must be used.

The present invention therefore seeks to address these issues.

STATEMENTS OF INVENTION

According to a first aspect of the present invention there is provided a sealing assembly for providing a seal between a substantially circular first element and a second element, the first element being rotatable with respect to the second element, wherein the sealing assembly comprises: a sealing member disposed between the first and second elements, the sealing member comprising a ring disposed about the first element and carried on the second element; a first seal portion for providing a first seal between the sealing member and the first element, the plane of the first seal portion being in a first direction; and a second seal portion for providing a second seal between the sealing member and the second element the plane of the second seal portion being in a second direction; wherein the first direction is at an angle with respect to the second direction and the sealing member is disposed such that the sealing member is movable relative to the second element in the second direction; and the sealing assembly further comprises one or more first holding means that pivotably links the sealing member and second element, the one or more first holding means being configured to constrain movement of the sealing member in a circumferential direction.

The first and second directions may be substantially orthogonal.

The first element is rotatable with respect to the second element and the sealing member comprises a ring disposed about the first element. The first direction may correspond to an axial direction and the second direction may correspond to a radial direction. Accordingly, the second seal portion may be disposed in a substantially radial direction and the first seal portion may be disposed in a substantially axial direction.

The sealing assembly comprises one or more first holding means. The first holding means is arranged so as to constrain movement of the sealing member in a circumferential direction and may permit a degree of movement in the first and second directions. The circumferential direction may be at an angle with respect to a plane defined by the first and second directions. The first, second and third directions may be mutually orthogonal.

The sealing assembly may comprise two or more first holding means disposed about the circumference of the ring. The sealing assembly may comprise three or more first holding means disposed about the circumference of the ring. The first holding means may constrain movement of the ring in the circumferential direction and/or the radial plane.

The first holding means may comprise a linkage assembly comprising a second link and a third link. The second link may be pivotably connected to the second element at a first end and the third link at a second end. The third link may be fixed to the sealing member. The first and second ends of the second link may be aligned in the circumferential direction.

The sealing assembly may further comprise one or more second holding means. The second holding means may be arranged so as to constrain movement of the sealing member in the first direction. The second holding means may comprise a first link arranged so as to constrain movement of the sealing member in the first direction. The first link may be connected to the sealing member and the second element at first and second points on the first link respectively.

A counterbalance may be provided at a third point on the first link. The second point on the first link may be between the first and third points on the first link. The second point may act as a pivot point. The mass of the counterbalance and/or position of the first, second and third points on the first link may be selected such that the counterbalance may balance the mass of the sealing member.

The sealing assembly may further comprise one or more resilient elements connecting the sealing member to the second element. The resilient elements may be arranged such that the sealing member is centred about the first element.

The first seal portion may comprise any type of seal element. For example, it may comprise one of a brush seal element, a labyrinth seal element, a piston-ring seal element, a carbon seal element and an air-riding seal element. The second seal portion may comprise any type of seal element. For example, it may comprise one of a brush seal element, a labyrinth seal element, a piston-ring seal element, a carbon seal element and an air-riding seal element.

The sealing assembly described above may be provided in a turbomachine. The sealing assembly described above may be provided in a gas turbine.

According to a second aspect of the present invention there is provided a method of sealing between a substantially circular first element and a substantially circular second element, the first element being rotatable with respect to the second element, the method comprising: providing a sealing assembly comprising: a sealing member disposed between the first and second elements; a first seal portion for providing a first seal between the sealing member and the first element, the plane of the first seal portion being in a first direction; and a second seal portion for providing a second seal between the sealing member and the second element, the plane of the second seal portion being in a second direction, wherein the first direction is arranged at an angle with respect to the second direction; and the sealing assembly having one or more first holding means that pivotably link the sealing member and second element, and allowing the sealing member to move relative to the second element in the second direction, the one or more first holding means configured to constrain movement of the sealing member in a circumferential direction.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
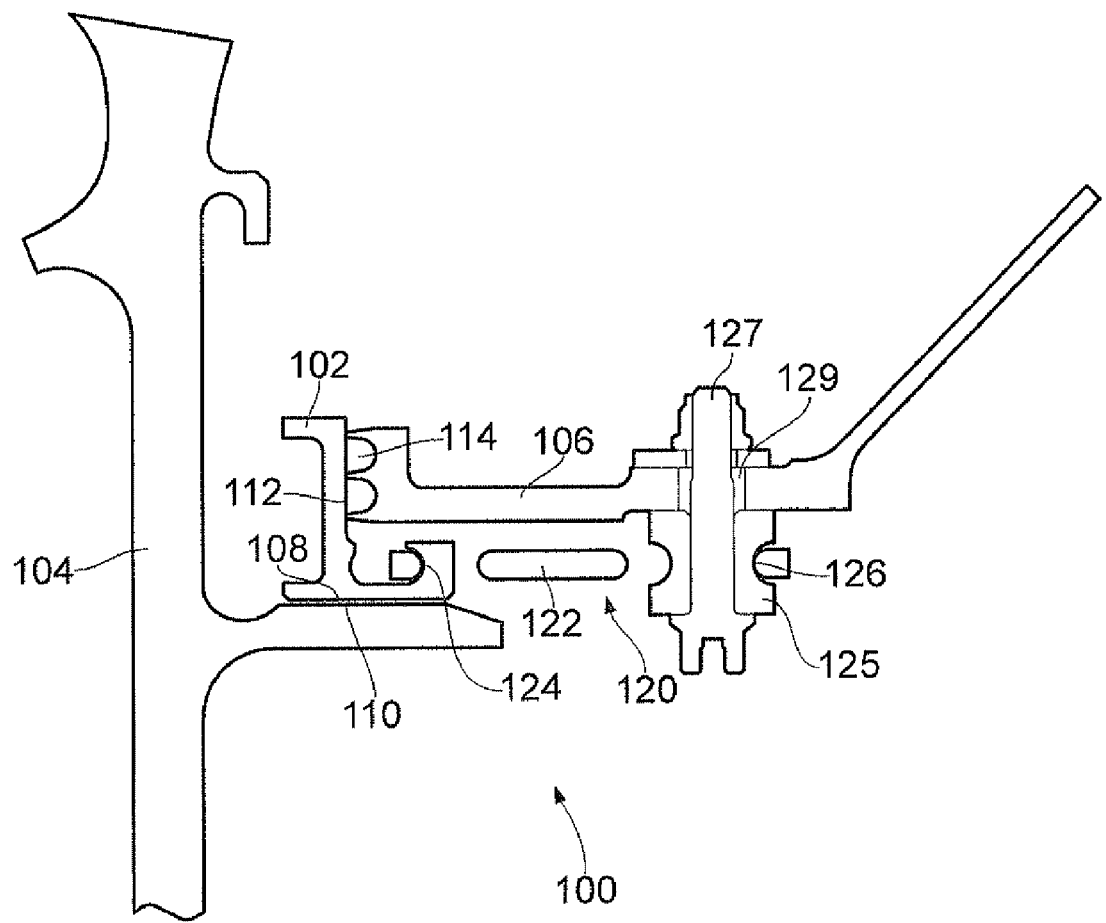
FIG. 1 shows a sectional side view of a sealing assembly according to a first embodiment of the present invention.

With reference to FIG. 1, a sealing assembly 100, according to a first embodiment of the present invention, comprises a sealing member 102 adjacent to a first element 104 and a second element 106. The sealing assembly 100 provides a seal between the first element 104 and the second element 106. The first element 104 is movable with respect to the second element 106 and, in particular, the first element 104 is rotatable with respect to the second element 106. In the case of the first element 104 rotatable with respect to the second element 106, the sealing member 102 comprises a ring disposed about an axis of the first element 104.

The sealing member 102 comprises a first seal portion 108 and the first element 104 comprises a corresponding third seal portion 110. The first and third seal portions 108, 110 provide a first seal between the sealing member 102 and the first element 104. The plane of the first seal portion 108 is in a first direction, for example a substantially axial direction.

The sealing member 102 comprises a second seal portion 112 and the second element 106 comprises a corresponding fourth seal portion 114. The second and fourth seal portions 112, 114 provide a second seal between the sealing member 102 and the second element 106. The plane of the second seal portion 112 is in a second direction, for example a substantially radial direction. The first direction is arranged at an angle with respect to the second direction and, in particular, the first and second directions are substantially orthogonal.

The sealing member 102 is disposed such that the sealing member 102 is movable relative to the second element 106 in the second direction. For example, a portion of the sealing member 102 may be deformed such that only a portion of the sealing member 102 moves in the second direction, perhaps due to thermal gradients around its circumference. In addition, the entire sealing member 102 may expand or may translate in the second direction (i.e. move laterally). In the case of rotational symmetry, the second direction is equivalent to the radial direction and the direction of the second direction depends on the particular point on the circumference of the sealing member 102. Thus, a portion of the sealing member 102 may move in the second direction defined at the portion, for example if the sealing member 102 translates In other words, the sealing member 102 may move in the radial plane.

The sealing member 102 is a movable interface with an L-shaped section which is suspended within the static second element (for example the casing of a turbomachine) such that the movable sealing member 102 is downstream from the high pressure side. This gives a virtually frictionless method of support to the movable sealing member 102 and the differential pressure across the movable sealing member 102 will tend to centralise it with respect to the second element 106, which will in turn make it run concentrically with the rotating first element (for example a disc).

The first seal may comprise one of a brush seal element, a labyrinth seal element, a piston-ring seal element, a carbon seal element and an air-riding seal element. In the case of the use of a labyrinth seal, the labyrinths may be located on the first element 104 (for example a disc) in the conventional way and the movable sealing member 102 may be coated with an abradable coating. In the case of the use of a brush seal, the brush seal may be located on the movable sealing member 102 and the smooth face on which the brush seal rubs may be located on the first element (for example a disc).

To accommodate lateral/radial movements of the sealing member 102, the second seal comprises a face seal between the sealing member and the second element 106. The second seal may comprise one of a brush seal element, a labyrinth seal element, a piston-ring seal element, a carbon seal element and an air-riding seal element. However, because minimal friction between the two components is desirable, a labyrinth type seal is preferred. For maximum efficiency, the clearance between the sealing member and the second element 106 at the face seal needs to set to an absolute minimum, even touching if low enough friction can be maintained. To aid low friction movement between the sealing member 102 and the second element 106 at the face seal, the smooth face (which could be on either component) may have a low friction coating applied to it, for example, a dry film lubricant.

Figure 2:
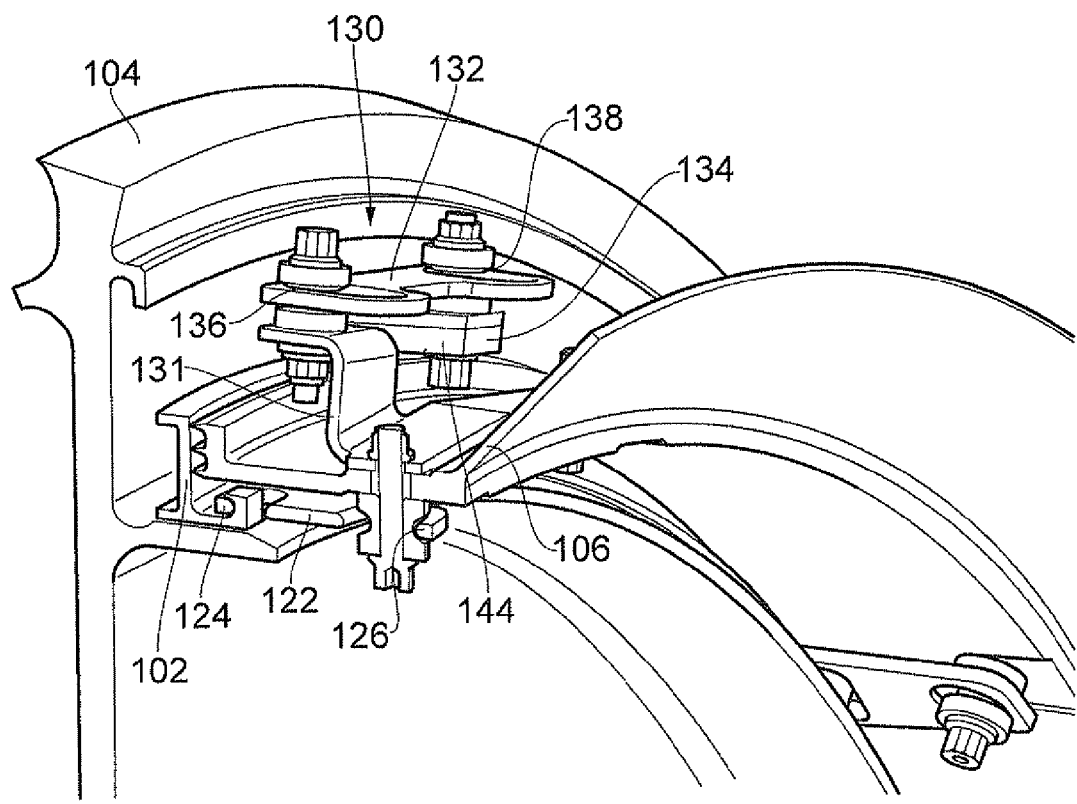
FIG. 2 shows a sectional perspective view of a sealing assembly according to a first embodiment of the present invention.

With reference to FIG. 2, the sealing assembly 100, according to the first embodiment of the present invention, further comprises one or more first holding means 130. The first holding means 130 is arranged so as to constrain movement of the sealing member 102 in a third direction and permit a degree of movement in the first and second directions. The third direction is at an angle with respect to a plane defined by the first and second directions. In the particular embodiment shown, the third direction corresponds to a circumferential direction and the first, second and circumferential directions are substantially mutually orthogonal.

Figure 3:
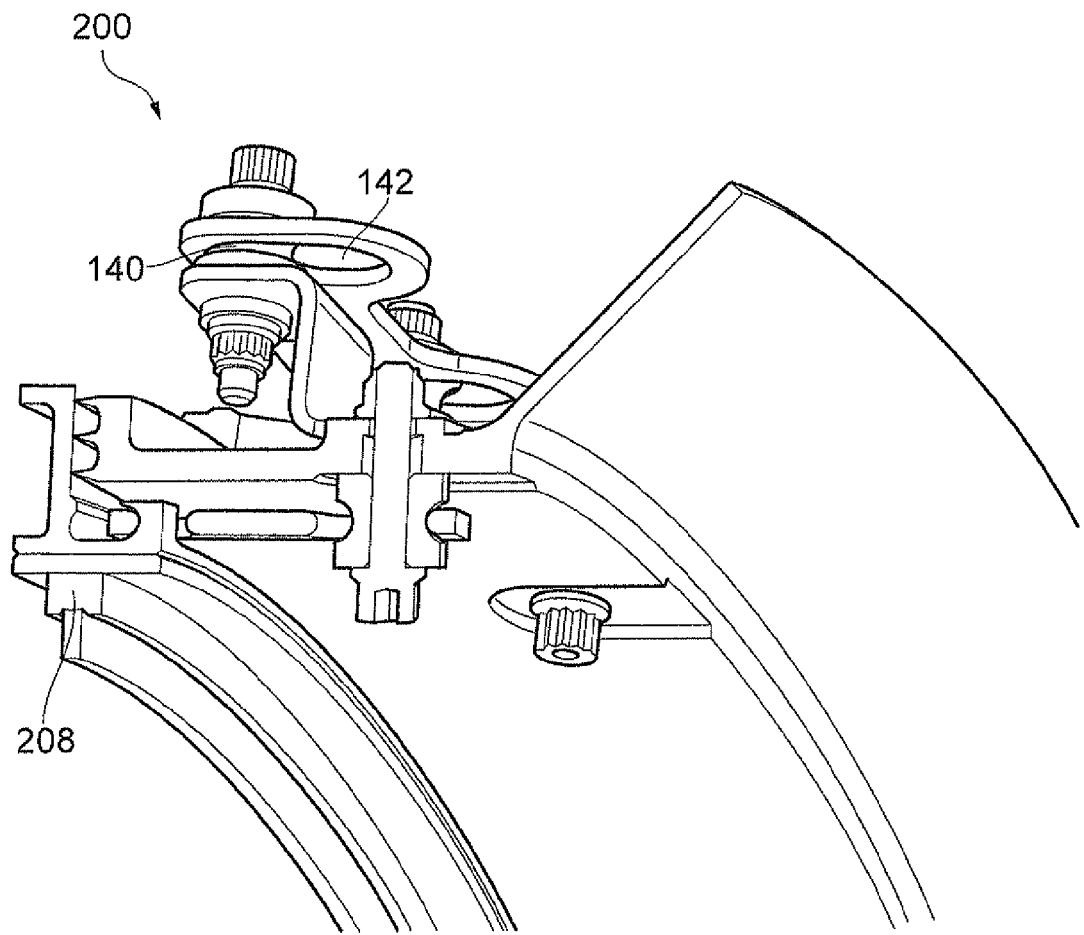
FIG. 3 shows a sectional perspective view of a sealing assembly according to a second embodiment of the present invention.

The first holding means 130 comprises a linkage assembly comprising a second link 132 and a third link 134. The second link 132 is pivotably connected to the second element 106 at a first end 136 of the second link 132. The second link 132 is also pivotably connected to a first end 144 of the third link 134 at a second end 138 of the second link 132. The second link 132 is connected to the second element 106 via an intermediate connecting plate 131, which is in turn fixed to the second element 106. The pivotable connections at the first and second ends 136, 138 of the second link 132 may be achieved by a shaft comprising a recessed/bevelled portion 140 and a corresponding slot 142 in the second link 132 (as shown in FIG. 3). Alternatively, the pivotable connections may be achieved by any other known pivotable connection means, for example, a ball and socket joint or any other low friction omni-directional joint. The first and second ends of the second link are aligned in the third direction, which in the particular embodiment shown, corresponds to the circumferential direction.

Figure 4:
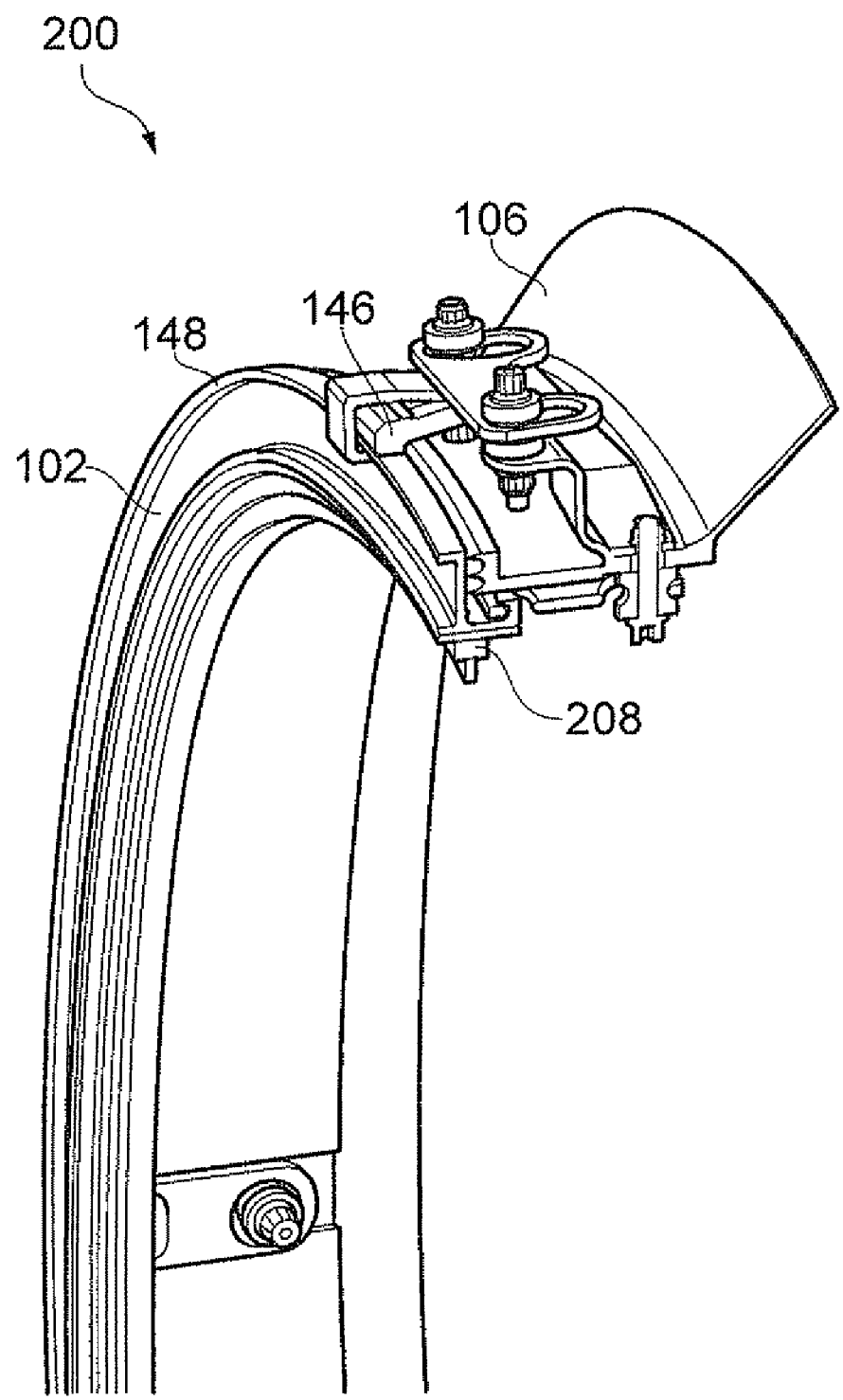
FIG. 4 shows a sectional perspective view of a sealing assembly according to a second embodiment of the present invention.

The third link 134 is fixed to the sealing member 102 at a second end 146 of the third link 134 (as shown in FIG. 4). The second end 146 of the third link 134 clamps on to a rim 148 of the movable sealing member 102. The first and second ends 144, 146 of the third link 134 are at least initially substantially aligned in the axial direction.

By aligning the first and second ends of the second link in the third direction, the linkage assembly circumferentially restrains the sealing member 102, which would otherwise have a tendency to move in a circumferential direction due to intermittent (in the case of the labyrinth seal) or continuous (in the case of a brush seal) contact of the sealing member 102 with the first element 104. By contrast, due to the pivotable connections and the fact that the first and second ends of the second link are offset from each other, the linkage assembly would not generally hinder lateral movement of the sealing member 102 in the second direction, i.e. in the radial plane. However, the linkage assembly should optimally be placed such that the attachment point at the sealing member 102, i.e. the second end 146 of the third link 134, is in the plane of the maximum lateral movement.

The sealing assembly 100 further comprises one or more second holding means 120. The second holding means 120 is arranged so as to constrain movement of the sealing member 102 in the first direction, i.e. in the axial direction. The second holding means comprises a first link 122 arranged so as to constrain movement of the sealing member in the first direction. The first link 122 is connected to the sealing member 102 and the second element 106 at first and second points 124, 126 on the first link 122 respectively. There are preferably three or more first links 122 disposed about the circumference of the second element 106 and sealing member 102. The sealing member 102 is thus suspended within the static second element 106 on a series of axially orientated links 122. The second point 126 is provided by a bobbin 125 carried on a bolt 127 which extends through a slot 129 in the second element 106. Manufacturing tolerances can be adjusted out on assembly by moving the bolt 127 axially within the slot 129.

With reference to FIGS. 3 and 4, a first seal portion 208 of a sealing assembly 200 according to the second embodiment of the invention comprises a brush seal portion. The second embodiment is otherwise identical to the first embodiment of the invention.

Figure 5:
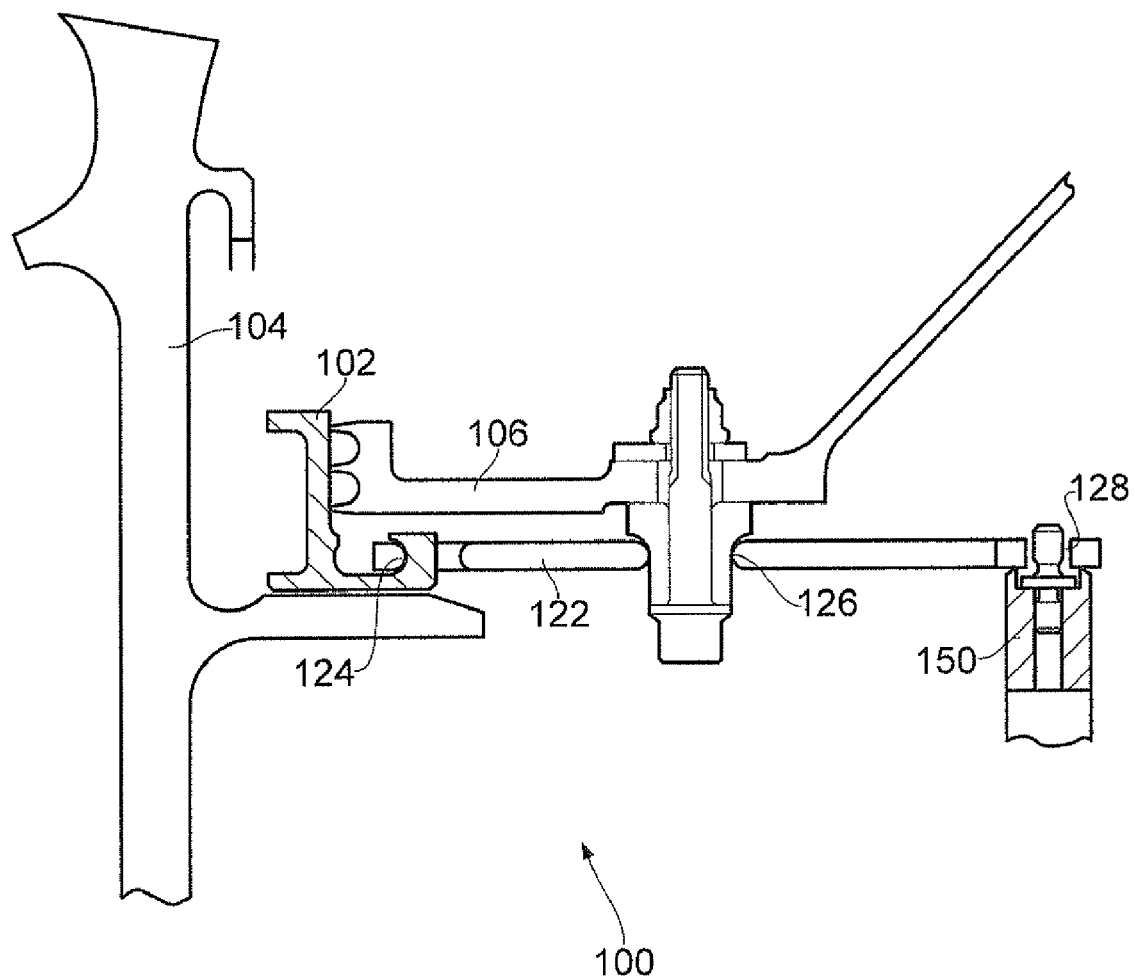
FIG. 5 shows a sectional side view of a sealing assembly according to a third embodiment of the present invention.

With reference to FIG. 5, the sealing assembly 100 according to a third embodiment of the present invention comprises a counterbalance 150. The counterbalance 150 is provided at a third point 128 on the first link 122 such that the second point 126 on the first link is between the first and third points on the first link and the second point acts as a pivot point. In other words, the third embodiment of the invention is achieved by extending the axial first link 122 beyond the second attachment point to the second element 106 in a direction opposite to the sealing member 102. The attachment point to the second element 106 at the second point 126 then effectively becomes a pivot and the first link becomes a lever. The third embodiment is otherwise identical to the first and second embodiments of the invention.

The mass of the counterbalance and/or position of the first, second and third points 124, 126, 128 on the first link 122 are selected such that the counterbalance balances the mass of the sealing member 102. The length of the levers fore and aft of the pivot point at the second point 126 gives the leverage ratio, which determines the extent of the counterbalancing. If the levers are the same length fore and aft and the counterbalance the same weight as the sealing member 102, then the sealing member 102 is fully balanced and will be effectively immune to the effects of "g" manoeuvres. A "g" manoeuvres-resistant version of the invention may be particularly useful for the labyrinth seal case and also for the brush seal case where high "g" manoeuvres are encountered, for example when the sealing assembly 100 is used in military jet engines.

A sealing assembly according to a fourth embodiment of the present invention (not shown) comprises one or more resilient elements connecting the sealing member to the second element. The resilient elements are arranged such that the sealing member is centred about the first element and the resilient elements act radially on the sealing member. The resilient elements would be adjusted on assembly to centre the sealing member. The resilient elements may comprise springs, for example, low rate springs of coil or leaf variety, or any other resilient means. The resilient elements counteract the weight of the sealing member and may to a lesser extent counteract the forces exerted on the sealing member by virtue of "g" manoeuvres, for example when the seal assembly is used in a jet engine. With the fourth embodiment, the lateral force on the first element during start-up, shut-down and "g" manoeuvres would be reduced.

Figure 6:
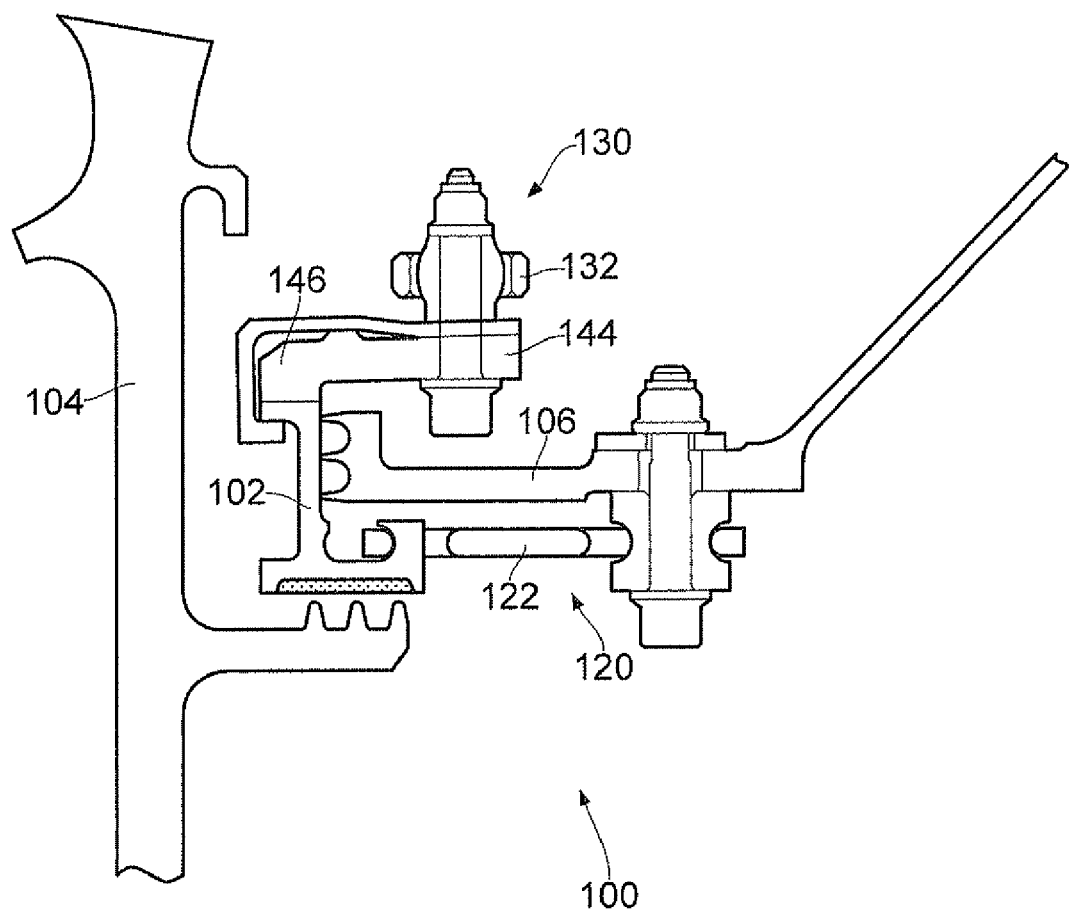
FIG. 6 shows a sectional side view of a sealing assembly according to a fifth embodiment of the present invention.

With reference to FIG. 6, the sealing assembly 100 according to a fifth embodiment of the present invention comprises two or more first holding means 130 disposed about the circumference of the sealing member ring 102. By providing an additional first holding means 130, movement of the sealing member 102 in a radial plane is constrained because the each of the first holding means restricts motion in different directions within the radial plane. However, if two first holding means 130 are provided at diametrically opposed points on the circumference of the sealing member ring 102, then motion in only one particular direction will be constrained. Therefore the sealing assembly 100 according to the fifth embodiment may in particular comprise three or more first holding means 130 disposed about the circumference of the sealing member 102 to ensure that this is not the case. The first holding means 130 may be equally spaced about the circumference of the sealing member 102.

The sealing member 102 (which may also be referred to as a squirrel cage) is supported (centralised) within the second element 106 (for example a turbomachine casing) by the use of two or more of the first holding means 130 (i.e. circumferential links). As for the first holding means 130 described above with reference to the first to fourth embodiments, one end 138 of the second link 132 is attached to the sealing member 102 via a low friction omni-directional joint and the third link 134. The other end 136 of the second link 132 is attached to the second element 106 (casing), also by an omni-directional joint. The linking assembly could equally well be substituted by a "tongue and slot" arrangement, whereby a close fitting tongue is located in a slot. The tongues could all be on the movable sealing member 102 and the slots on the second element 106, or vice versa.

Axial location of the sealing member 102 is the same as for the previously described embodiments of the invention. In this way, the sealing member is free to expand and contract independently of the second element 106 (and vice versa) and the sealing member is also free from any local lateral deflections that may be experienced by the second element 106 (for example because the casing is used to mount a gearbox). The material of the sealing member is independent of the second element, enabling closer thermal matching of the sealing member with the first element 102.

By contrast with the first to fourth embodiments of the present invention, the sealing member 102 of the fifth embodiment is not required to move laterally in as frictionless a manner as possible because such movements are restricted. The face seal forming the second seal between the sealing member 102 and the second element 106 can therefore tolerate some friction without affecting the operation of the sealing assembly 100. Thus, a piston ring type seal may be used for the face seal forming the second seal, as this would effectively reduce the leakage across this face to zero.

With the fifth embodiment of the invention the radial position of the sealing member 102 is independent of the weight of the sealing member 102 and any "g" manoeuvres. However, to achieve this independence the sealing member 102 does not have the ability to deflect laterally, which contrasts with the previous embodiments. As such, the fifth embodiment would be particularly useful in a turbofan where lateral deflections between the sealing member 102 and the first element 104 (i.e. disc) are negligible but where there would be a large thermal mismatch between the second element 106 (i.e. casing) and the first element 104 and/or local deflections of the second element 106. This would normally require an undesirably large running clearance (in the case of a labyrinth seal) or would prevent the use of a brush seal because the range of movement between the disc and the casing is too great. The fifth embodiment of the present invention would therefore avoid this situation.

In all embodiments, the sealing member is free to expand and contract independently of the second element (and vice versa) without a loss of sealing through the second seal portion. The material of the sealing member may be chosen such that the relative thermal expansion and contraction of the sealing member and first element is matched to limit variation in clearance between the sealing member and the first element through a thermal cycle, thus maintaining the seal between the sealing member and the first element.

The invention claimed is:

1. A sealing assembly for providing a seal between a substantially circular first element and a second element, the first element being rotatable with respect to the second element, the sealing assembly comprises:
    a sealing member disposed between the first and second elements, the sealing member comprising a ring disposed about the first element and carried on the second element;
    a first seal portion for providing a first seal between the sealing member and the first element, the plane of the first seal portion being in a first direction; and
    a second seal portion for providing a second seal between the sealing member and the second element the plane of the second seal portion being in a second direction;
    wherein the first direction is at an angle with respect to the second direction and the sealing member is disposed such that the sealing member is movable relative to the second element in the second direction; and
    the sealing assembly further including:
        one or more first holding means that pivotably links the sealing member and the second element, the first holding means including a second link, the second link being pivotable and being configured to constrain movement of the sealing member in a circumferential direction; and
        one or more second holding means, the second holding means being arranged so as to constrain movement of the sealing member in the first direction, the second holding means including a first link, the first link being arranged so as to constrain movement of the sealing member in the first direction, the first link being connected to the sealing member and the second element at first and second points on the first link respectively.

2. The sealing assembly as claimed in claim 1, wherein the first and second directions are substantially orthogonal.

3. The sealing assembly as claimed in claim 1, wherein the sealing assembly comprises two or more first holding means disposed about the circumference of the ring so as to constrain movement of the ring in a circumferential direction.

4. The sealing assembly as claimed in claim 1, wherein the first holding means comprises a linkage assembly including the second link and a third link, the second link being pivotably connected to the second element at a first end and the third link at a second end; and the third link being fixed to the sealing member, wherein the first and second ends of the second link are aligned in the circumferential direction.

5. The sealing assembly as claimed in claim 1, wherein a counterbalance is provided at a third point on the first link such that the second point on the first link is between the first and third points on the first link and the second point acts as a pivot point.

6. The sealing assembly as claimed in claim 5, wherein the mass of the counterbalance and/or position of the first, second and third points on the first link are selected such that the counterbalance balances the mass of the sealing member.

7. The sealing assembly as claimed in claim 1, wherein the sealing assembly further comprises one or more resilient elements connecting the sealing member to the second element, the resilient elements being arranged such that the sealing member is centred about the first element.

8. The sealing assembly as claimed in claim 1, wherein the first seal portion comprises one of a brush seal element, a labyrinth seal element, a piston-ring seal element, a carbon seal element and an air-riding seal element.

9. The sealing assembly as claimed in claim 1, wherein the second seal portion comprises one of a brush seal element, a labyrinth seal element, a piston-ring seal element, a carbon seal element and an air-riding seal element.

10. A turbomachine comprising the sealing assembly of claim 1.

11. A gas turbine comprising the sealing assembly of claim 1.

12. A method of sealing between a substantially circular first element and a substantially circular second element, the first element being rotatable with respect to the second element, the method comprising:
    providing a sealing assembly comprising: a sealing member disposed between the first and second elements; a first seal portion for providing a first seal between the sealing member and the first element, the plane of the first seal portion being in a first direction; and a second seal portion for providing a second seal between the sealing member and the second element, the plane of the second seal portion being in a second direction, wherein the first direction is arranged at an angle with respect to the second direction; and the sealing assembly having one or more first holding means that pivotably link the sealing member and second element, the first holding means including a second link, and
    allowing the sealing member to move relative to the second element in the second direction, the second link being pivotable and being configured to constrain movement of the sealing member in a circumferential direction;

wherein the sealing assembly further comprises one or more second holding means, the second holding means being arranged so as to constrain movement of the sealing member in the first direction, the second holding means including a first link, the first link being arranged so as to constrain movement of the sealing member in the first direction, the first link being connected to the sealing member and the second element at first and second points on the first link respectively.

* * * * *